US011891275B2

(12) United States Patent
Geisshüsler et al.

(10) Patent No.: US 11,891,275 B2
(45) Date of Patent: Feb. 6, 2024

(54) BRAKE DEVICE, E.G. WITH A WEDGE-SHAPED BRAKE ELEMENT, FOR BRAKING A TRAVELLING BODY THAT CAN BE MOVED IN A GUIDED MANNER ALONG A GUIDE RAIL IN A MOVEMENT DIRECTION

(71) Applicant: Inventio AG, Hergiswil (CH)

(72) Inventors: Michael Geisshüsler, Sursee (CH); Faruk Osmanbasic, Sins (CH); Adrian Steiner, Inwil (CH); Julian Stähli, Meggen (CH); Heinz Widmer, Affoltern am Albis (CH); Volker Zapf, Kriens-Obernau (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/756,913

(22) PCT Filed: Dec. 1, 2020

(86) PCT No.: PCT/EP2020/084115
§ 371 (c)(1),
(2) Date: Jun. 6, 2022

(87) PCT Pub. No.: WO2021/115846
PCT Pub. Date: Jun. 17, 2021

(65) Prior Publication Data

US 2023/0011263 A1 Jan. 12, 2023

(30) Foreign Application Priority Data

Dec. 12, 2019 (EP) .................................... 19215738

(51) Int. Cl.
*B66B 5/22* (2006.01)

(52) U.S. Cl.
CPC ..................................... *B66B 5/22* (2013.01)

(58) Field of Classification Search
CPC ....................................................... B66B 5/22
See application file for complete search history.

(56) References Cited

U.S. PATENT DOCUMENTS

| | | | | |
|---|---|---|---|---|
| 8,186,483 B2 * | 5/2012 | Sirigu | ....................... | B66B 5/22 187/373 |
| 11,565,909 B2 * | 1/2023 | Gou | .......................... | B66B 1/36 |

(Continued)

FOREIGN PATENT DOCUMENTS

| | | | |
|---|---|---|---|
| CN | 105858398 A * | 8/2016 | |
| DE | 202019101479 U1 * | 7/2020 | .............. B66B 5/18 |

(Continued)

*Primary Examiner* — Diem M Tran
(74) *Attorney, Agent, or Firm* — William J. Clemens; Shumaker, Loop & Kendrick, LLP

(57) ABSTRACT

A brake device for braking a traveling body movable along a guide rail in a movement direction includes a holder mounting a brake element that has a brake surface directed toward the guide rail, the brake element being movable relative to the holder between a free-running position and a braking position. A pretensioning element is activated to exert a force that moves the brake element toward the braking position. A release element holds the pretensioning element in a holding state and is activated into a released state to reconfigure the pretensioning element from a deactivated configuration into the activated configuration. A pressing element in an actuated state generates a force on the brake element in a direction toward the guide rail to enable a reset of the brake device.

16 Claims, 5 Drawing Sheets

(56) References Cited

U.S. PATENT DOCUMENTS

| | | | | |
|---|---|---|---|---|
| 2002/0117357 | A1* | 8/2002 | Hugel | B66B 5/22 187/373 |
| 2008/0128218 | A1* | 6/2008 | Gremaud | B66B 5/22 187/250 |
| 2013/0081908 | A1* | 4/2013 | Meierhans | B66B 5/20 188/67 |
| 2016/0289045 | A1* | 10/2016 | Osmanbasic | F16D 63/008 |
| 2017/0240381 | A1 | 8/2017 | Terry et al. | |

FOREIGN PATENT DOCUMENTS

| | | | | |
|---|---|---|---|---|
| EP | 1840068 | A1 * | 10/2007 | B66B 5/04 |
| KR | 20070069131 | A * | 7/2007 | |
| WO | 2005044709 | A1 | 5/2005 | |
| WO | WO-2006064555 | A1 * | 6/2006 | B66B 5/04 |
| WO | 2011078848 | A1 | 6/2011 | |
| WO | 2015047391 | A1 | 4/2015 | |
| WO | WO-2015191695 | A1 * | 12/2015 | B66B 5/04 |
| WO | 2017087978 | A1 | 5/2017 | |

* cited by examiner

BRAKE DEVICE, E.G. WITH A WEDGE-SHAPED BRAKE ELEMENT, FOR BRAKING A TRAVELLING BODY THAT CAN BE MOVED IN A GUIDED MANNER ALONG A GUIDE RAIL IN A MOVEMENT DIRECTION

FIELD

The present invention relates to a brake device for braking a traveling body that can be moved in a guided manner along a guide rail in a movement direction. The invention further relates to an elevator system having such a brake device as well as to a method for releasing a previously activated brake device in such an elevator system.

BACKGROUND

In elevator systems, elevator cars are moved between different floors using a drive machine. In particular, in elevator systems for tall buildings, the drive machine usually drives cable-like suspension elements which hold and move the elevator car and a counterweight. The elevator car and the counterweight are guided laterally by one or more guide rails during their vertical movement in a movement direction.

The elevator car and counterweight each represent a traveling body which can be moved along a generally vertical travel path. Such a traveling body is described below using the example of the elevator car. However, the brake device described herein can also be used to brake the counterweight.

In order to be able to safely brake a movement of the elevator car, a brake device is generally provided on the elevator car. This brake device can be configured in particular as a safety brake and can be designed to be able to brake the elevator car very efficiently and quickly, for example to stop the elevator car from falling. The brake device typically has brake elements which, when the brake device is activated, are pressed against one or more surfaces of a guide rail in order to produce a necessary braking force for braking the elevator car by means of friction produced thereby. In the case of an embodiment as a safety brake, the brake device is usually designed to be self-reinforcing, i.e., a pressing pressure with which the brake element is pressed against the guide rail is reinforced due to the relative motion between the guide rail and the brake device itself.

Conventional brake devices for elevator systems, in particular safety brakes, are described, for example, in WO 2015/047391 A1, WO 2005/044709 A1, WO 2011/078848 A1 and WO 2017/087978 A1.

It has been observed that it can be complex, in particular in the case of self-reinforcing brake devices, to bring a brake device which has been activated back into its original, deactivated state.

SUMMARY

There may therefore be a need, among other things, for a brake device which can be returned to its initial state in a simple manner after a braking process. Furthermore, there may be a need for an elevator system equipped with such a brake device and for a method for releasing a previously activated brake device in such an elevator system.

A need of this kind can be met by the subject matter according to any of the advantageous embodiments that are defined in the following description.

According to a first aspect of the invention, a brake device for braking a traveling body that can be moved in a guided manner along a guide rail in a movement direction is proposed. The brake device has a holder, a brake element, a pretensioning element, a release element and a pressing element. The brake element has a brake surface which can be directed toward the guide rail and is held and mounted on the holder so that the brake element can be moved relative to the holder between a free-running position and a braking position. The brake surface of the brake element can be spaced laterally apart from the guide rail in the free-running position and can be pressed laterally against the guide rail in the braking position. The pretensioning element, in a deactivated configuration, does not exert a force on the brake element that moves the brake element toward the braking position and, in an activated configuration, exerts a force on the brake element that moves the brake element toward the braking position. The release element, in the first configuration, holds the pretensioning element in a holding state and, when the release element is activated into a released state, reconfigures the pretensioning element from the deactivated configuration into the activated configuration. The pressing element, in an unactuated state, does not generate a force on the brake element in a direction which can be oriented toward the guide rail and, in an actuated state, generates a force on the brake element in a direction which can be oriented toward the guide rail.

According to a second aspect, an elevator system which has a guide rail, an elevator car that can be moved in a guided manner along the guide rail in a movement direction, a drive apparatus for moving the elevator car, and a brake device according to an embodiment of the first aspect of the invention that is attached to the elevator car by its holder and is arranged so as to adjoin the guide rail is described.

According to a third aspect of the invention, a method for releasing a previously activated brake device in an elevator system according to an embodiment of the second aspect of the invention is described. When the brake device is activated, the brake element is engaged by moving the brake element relative to the holder opposite a movement direction of the elevator car to be braked into a fully engaged position in which the brake surface rests against the guide rail and the brake element is clamped between the guide rail and the holder. In the method, the pressing element of the brake device is first actuated and then the brake device is moved by moving the elevator car by means of the drive apparatus in a release direction opposite to the movement direction to be braked.

Possible features and advantages of embodiments of the invention can be considered, inter alia and without limiting the invention, to be based upon the concepts and findings described below.

In summary, the brake device described herein has at least a holder, a brake element, a pretensioning element, and a release element. The components mentioned can be configured similarly to conventional brake devices. The brake device described here differs from conventional brake devices in particular by way of the additional provision of a pressing element. The pressing element can be used to press the brake element against a surface of the guide rail in order to be able to temporarily hold the brake element stationary on the guide rail, for example during a release process in which the previously activated brake device is intended to be released again and brought into its initial state.

The individual components of the brake device and their functions are described in detail below.

On the one hand, the holder is used as a bearing to hold the brake element and to be able to move the element relative to the holder. In this case, the holder can be adapted to guide the brake element in a desired direction or along a desired path, when the element moves relative to the holder. For example, the holder can support and guide the brake element in a way that the element can move back and forth between the free-running position and the braking position, for example along a linear path. On the other hand, the holder is the component of the brake device which is coupled directly or indirectly to the elevator car to be braked and therefore remains stationary relative to the elevator car. Mechanically, the holder can be adapted in such a way that it can withstand the forces caused by the brake element during a braking process.

The brake element has a brake surface which is directed toward the guide rail and is configured such that when the brake surface comes into contact with a surface of the guide rail, strong frictional forces are generated which counteract further movement of the brake element relative to the guide rail. These forces can lead to the brake element being able to move relative to the holder of the brake device in the course of a braking process, and a braking effect being able to increase in a self-reinforcing manner. These forces can be transferred to a large extent to the holder and then to the elevator car in order to efficiently brake the elevator car's motion relative to the guide rail. As long as the brake device is unactuated, the brake element remains in its free-running position in which its brake surface is spaced laterally apart from the guide rail, i.e., in a direction transverse to the opposite surface of the guide rail. A gap between the brake surface and the surface of the guide rail can be a plurality of millimeters in the free-running position, for example. As soon as the brake device is actuated, the brake element is moved from the free-running position to the braking position, wherein the brake surface of the brake element is brought toward the guide rail and pressed against the guide rail. The brake element can be guided in its movement by the holder. A movement path can be linear, for example. In particular, the movement path can extend at a shallow angle obliquely to the surface of the guide rail against which the brake surface of the brake element is intended to be pressed.

The pretensioning element is provided for the purpose of moving the brake element from the free-running position to the braking position when the brake device is actuated. However, as long as the brake device is not actuated, the pretensioning element should not move the brake element. To carry out this function, the pretensioning element is configured to be able to be reconfigured between a deactivated configuration and an activated configuration. In the deactivated configuration, the pretensioning element does not exert a force on the brake element that would move the brake element toward the braking position. In the activated configuration, on the other hand, the pretensioning element exerts a force on the brake element that moves the brake element from the free-running position toward the braking position.

In order to be able to hold the pretensioning element in the deactivated configuration while the brake device is unactuated, the brake device further has a release element. The release element can also be brought into different states. In a holding state, the release element holds the pretensioning element in its deactivated configuration such that ultimately the brake element is not moved into its braking position by the pretensioning element. However, if the release element has been activated in response to actuation of the brake device, the release element transitions to a released state. The release of the release element is thus accompanied by a reconfiguration of the pretensioning element from its initially deactivated configuration into the activated configuration so that the pretensioning element moves the brake element into its braking position.

While the functionalities explained above and the structural configurations of the brake device used for this purpose are similar to conventional brake devices, the brake device described here also has the pressing element. The pressing element can also be switched back and forth between at least two different states. In an unactuated state, the pressing element does not exert a force on the brake element in a direction toward the guide rail. However, as soon as the pressing element is switched to its actuated state, it generates a force which presses the brake element in a direction toward the guide rail. The pressing element can thus be used in a controllable manner to move the brake element together with its brake surface toward the guide rail or to hold them on the guide rail and/or to press them on the guide rail, preferably independently of any influences from other components of the brake device.

As will be explained in more detail below, the pressing element can thus advantageously be used, in particular during a release process in which the previously activated brake device is intended to be released again, to hold the brake element stationary on the guide rail at least temporarily by the brake surface of the brake element being pressed against the guide rail with a sufficient pressing force by the pressing element. Such temporary fixing of the brake element on the guide rail can advantageously be used to be able to return the previously activated brake device to its original, unactuated state in a simple manner and preferably without additional aids and/or interventions, for example by a technician.

According to an embodiment, the brake element has a width that tapers in the movement direction. The width shall be measured between the brake surface and a sliding surface which is arranged opposite the brake surface. The holder forms a counter bearing along which the sliding surface of the brake element can be moved in cooperation with the counter bearing between the free-running position and the braking position.

In other words, the brake element can, for example, have a greater width on a front side in a typical movement direction of the brake element relative to the guide rail than on a rear side. The holder can be structurally configured in such a way that it forms a counter bearing for this brake element designed in this way, and therefore the brake element can be moved relative to the holder. Due to the tapering design of the brake element, the holder and the brake element should interact during a braking process in such a way that the brake element, when its sliding surface interacts with the counter bearing formed by the holder, is shifted from its free-running position to its braking position. Because of the tapering geometry of the brake element and the interaction of its sliding surface with the counter bearing formed by the holder, a braking effect that is self-reinforcing during the braking process can be achieved. This self-reinforcing braking effect can be achieved in particular by the fact that the brake element is pushed in the direction of its rear side, i.e., in the direction of the side on which the brake element has a smaller thickness, by the friction of its brake surface on the guide rail, and is thereby increasingly strongly clamped by the holder as a counter bearing and thus pressed against the guide rail.

In particular, according to an embodiment, the brake element can be wedge-shaped.

In such a wedge-shaped brake element, the brake surface and the sliding surface are each flat, but extend obliquely to one another. Such a wedge-shaped brake element can be easily produced and/or operated in the brake device. In particular, a counter sliding surface which acts as a counter bearing and is oriented obliquely relative to the opposite surface of the guide rail can be formed on the holder, along which counter sliding surface the sliding surface of the wedge-shaped brake element can be moved so that the brake element can be moved in a direction at an angle to the guide rail and therefore moved laterally from the free-running position to the braking position.

According to an embodiment, the pretensioning element is designed as an elastically deformable element, in particular as a spring element. It is arranged such that and interacts with the holder on one side and the brake element on the other side such that, in its activated configuration, the pretensioning element moves the brake element together with its brake surface until the surface is in mechanical contact with the guide rail.

In other words, the pretensioning element can be elastically deformed so that it can be brought into an elastically pretensioned state. For example, the pretensioning element can be designed as a spring element, for example as a helical spring or the like. The pretensioning element can, for example, be coupled at one end to the holder of the brake device and can interact with the brake element at an opposite end. Here, the pretensioning element should be arranged and configured such that, when it transitions from its deactivated configuration into its activated configuration, the pretensioning element moves the brake element toward the guide rail until the brake surface of the brake element comes into mechanical contact with the guide rail. For example, the pretensioning element can be mechanically pretensioned in its deactivated state and the mechanical pretensioning can be so strong and directed that the pretensioning element, when it is brought into the activated state, uses this pretensioning to move the brake element from its free-running position into its braking position and therefore press it at least slightly against the guide rail. Such a pretensioning element can ensure that the brake device can be activated reliably. In this case, the pretensioning element can be designed as a passive element, i.e., it does not need its own power supply.

According to a further embodiment, the pretensioning element can be designed as an elastically deformable element, in particular as a spring element, and can in turn be arranged such that and can interact with the holder on one side and the brake element on the other side such that, in its deactivated configuration, the pretensioning element is pretensioned in a first direction. In addition, the pretensioning element can here be arranged such that and interact with the holder and the brake element such that, in a fully engaged configuration of the brake element, the pretensioning element is pretensioned in a second direction opposite to the first direction. In the fully engaged configuration, the brake element can be moved, by means of friction on the guide rail, counter to the movement direction beyond a position in which the brake element, coming from the free-running position, first rests against the guide rail.

In other words, the pretensioning element, in its deactivated configuration, may be configured and arranged to be mechanically pretensioned in a first direction. In its activated configuration, the pretensioning element can then initially transition into a relaxed state and in the process shift the brake element from its free-running position into its braking position, i.e., toward the guide rail. If the brake surface of the brake element rests against the guide rail, it is typically moved further by the guide rail due to the relative movement still taking place between the guide rail and the brake device. The brake element is moved toward a fully engaged configuration in which it is progressively wedged between the holder and the guide rail so that the overall braking force applied is self-reinforcing. In moving toward the engaged configuration, the pretensioning element is again deformed from a temporarily relaxed state to a mechanically pretensioned state. However, this pretensioned state does not correspond to the original pretensioned state in the deactivated configuration of the pretensioning element. Instead, in this case, the pretensioning element is pretensioned in the opposite direction compared to the original pretensioned state.

In other words, the pretensioning element, which is designed as a spring for example, if it was compressed before being activated into the activated configuration, for example, can first relax in response to activation and thereby move the brake element until its brake surface contacts the guide rail. If the brake element is then carried along further by the guide rail, this initial motion of the brake element is continued and the spring is stretched as a result. Thus, when the brake element finally reaches its fully engaged configuration, the spring is greatly stretched and therefore exerts a restoring force on the brake element which, if not clamped in the engaged configuration, would move the brake element away from the fully engaged configuration and toward a position at which the brake element, coming from the free-running position, first rested against the guide rail.

Such a configuration and arrangement of the pretensioning element, as discussed below, may be beneficial in releasing the brake device to assist the brake element in moving out of the fully engaged configuration and back toward the original free-running position.

According to an embodiment, the release element can be designed as a pawl which can be moved between a latched position and an unlatched position. The pawl, in its latched position, holds the pretensioning element in its deactivated configuration, and the pawl, in its unlatched position, releases the pretensioning element into its activated configuration.

In other words, a pawl can be provided as the release element, which pawl can be moved between a latched and an unlatched position. In the latched position, the pawl can block the pretensioning element such that the element remains in its deactivated configuration. The pawl itself can, for example, be held in its latched position using an actuator, for example an electromagnet which can be energized in a controllable manner. When the pawl is released, i.e., moved to its unlatched position, the pawl releases the pretensioning element so that the pretensioning element transitions into its activated configuration and can then move the brake element from its original free-running position into its braking position.

Possible configurations of the pressing element, by means of which the brake element can be controlled and preferably pressed against the guide rail independently of other components of the brake device, are described below.

According to an embodiment, the pressing element can be designed using an electromagnet.

When an electric current is applied to an electromagnet, it can form a magnetic field. Due to this magnetic field, the electromagnet can experience an attractive force toward a magnetizable component, such as the guide rail in the present case. When the pressing element formed using the electromagnet is activated, the element can thus be pulled toward the guide rail and the force produced thereby can be transmitted to the brake element.

According to an embodiment, the pressing element can be rigidly connected to the brake element.

In other words, the pressing element can be connected to the brake element in such a way that forces acting on the pressing element are transmitted to the brake element. For example, tensile forces with which the pressing element is pulled toward the guide rail when the pressing element is activated can be transmitted to the brake element. Since the brake element is then pressed with its brake surface against the guide rail, the brake element experiences considerable frictional forces when the pressing element is activated. These frictional forces can result in the brake element being able to be fixed to the guide rail independently of other components of the brake device, as long as the pressing element is activated.

According to an embodiment, the pressing element can be attached to the brake element so as to adjoin the brake surface of the brake element.

In other words, the pressing element can be attached to the brake element in the vicinity of its brake surface. The pressing element can preferably be positioned in such a way that its surface which is directed toward the opposite guide rail is arranged flush with the brake surface of the brake element or is slightly set back compared to the brake surface. In other words, the surface of the pressing element can be spaced at the same distance from the opposite guide rail or a little further away from the opposite guide rail than the brake surface of the brake element. By means of such an aligned or slightly set-back arrangement of the pressing element, when the pressing element is activated, the pressing element is pulled toward the guide rail, but the pressing element does not come into contact with the guide rail, or at least not exclusively; in any case the brake surface of the brake element is also pressed against the guide rail. The pressing element can be arranged close enough to the guide rail to be able to interact with it over short distances. This can be particularly advantageous if the pressing element is to be pulled towards the guide rail using an electromagnet.

According to an embodiment, the brake device has two brake elements which can be arranged on opposite sides of the guide rail and at least one pressing element which cooperates with the brake elements.

In other words, the brake device can have two brake elements which face one another with their respective brake surfaces. The guide rail can extend in a gap between the brake surfaces. When the brake device is actuated, the two brake elements, driven by respective pretensioning elements, can be moved from their free-running position into their braking position and thereby the two brake elements come into contact with their brake surfaces on opposite surfaces of the guide rail. By providing two brake elements, a more symmetrical distribution of force within the brake device can be achieved overall in the event of car braking being carried out using the brake device. In order to be able to release the brake elements again, the brake device can have at least one pressing element which cooperates with the brake elements in order to temporarily keep the elements pressed against the guide rail. Optionally, it can be advantageous to equip each of the brake elements with its own pressing element.

According to an embodiment, the pressing element has a mechanism which is configured to shift the pressing element toward a counter element which can be arranged on an opposite side of the guide rail relative to the pressing element.

Such an embodiment can be provided with an electromagnet as an alternative or in addition to the configuration of the pressing element described above. The mechanism can be actuated to activate the pressing element. For this purpose, the mechanism can have a controllable actuator. Such an actuator can have an electric motor, for example. When the mechanism is actuated, it can move the pressing element toward the counter element. Since the counter element is arranged on the opposite side of the guide rail and can be supported, for example, on an opposite surface of the guide rail, the pressing element can be pulled toward the guide rail as a result. Since the pressing element is mechanically coupled to the brake element, the brake element can be pressed against the guide rail in this way.

Embodiments of the brake device described herein can be used in an elevator system according to the second aspect of the invention. The holder of the brake device is attached to the elevator car, i.e., fastened directly or indirectly to it. The brake device is arranged in such a way that it adjoins the guide rail guiding the elevator car and its brake element or brake elements can be moved into their braking position when the brake device is actuated and can interact with the guide rail in a braking manner.

According to the third aspect of the invention, a method by means of which embodiments of the brake device described herein can be released again after they have been previously activated or actuated is described.

Releasing the brake device can be understood here in particular as meaning that the brake device can independently end the interaction of its brake element with the guide rail and thus the effect of braking forces, i.e., without a technician having to be on site or to take action and release the brake device, for example, by manual intervention.

Preferably, releasing the brake device can even be understood to mean that the brake device, after it has been previously activated or actuated, i.e., subsequently to a braking operation, can be brought back into an initial configuration in which the elevator system can be operated normally and the brake device can be actuated again if needed. The release of the brake device can be partially automated or even fully automated.

In other words, the method proposed herein according to the third aspect of the invention can allow the elevator car to be braked using the brake device and can then, preferably without the intervention of a technician on site, bring the elevator system back into normal operation by the brake device being released and returned to its original state from which it can be reactivated. After the brake element has been pressed with its brake surface in contact with the guide rail due to the previous activation of the brake device and has then been moved into the fully engaged position, the brake element can be released from the fully engaged position. Furthermore, the brake element can even be moved back to its free-running position and then the pretensioning element can be set back to its deactivated configuration and the release element can be set into its state which holds the pretensioning element in the deactivated configuration.

In order to be able to achieve this, the pressing element is first actuated in the previously activated brake device. In this actuated state, the pressing element then causes a force on the brake element, as a result of which the brake surface of the brake element is pressed against the guide rail. In this way, the brake element is fixed to the guide rail. The elevator car is then moved, by means of the drive apparatus, in a release direction which is opposite to the movement direction to be braked originally. That is to say, if the elevator car has moved downward when the brake device is activated, it is moved upward by the drive apparatus in order to release the brake device. Such a motion of the elevator car in the release direction also moves the holder of the brake device in the release direction. However, since the brake element is firmly held on the guide rail due to the previously actuated pressing element, the brake element does not move together with the holder, but is moved relative to it from its previously assumed fully engaged position. A braking effect brought about by the brake element can thus be released.

According to an embodiment, the elevator car is moved in the release direction until the brake element, which is held stationary on the guide rail by the actuated pressing element, is moved relative to the holder into a fixing position in which the pretensioning element is in a position corresponding to its deactivated configuration, and the release element transitions from its released state into its holding state in order to hold the pretensioning element in its deactivated configuration.

In other words, in the method described here, the actuated pressing element can keep the brake element pressed in place on the guide rail until the brake element is moved so far relative to the holder of the brake device that the pretensioning element is fully pretensioned again, i.e., it is in its original deactivated position configuration. The pretensioning element which has been re-tensioned in this way can then be re-set in its deactivated configuration by returning the release element to its holding state from a previously released state. Generally, the brake device is then back in its original state and can then be operated again during normal operation of the elevator system, i.e., it can be actuated again.

Specifically, in relation to the embodiment described above, this can mean that the wedge-like brake element, which was pushed into its fully engaged position due to the previous activation and was thereby clamped between the holder and the guide rail, is first moved back from the fully engaged position by the elevator car together with the holder being moved in the release direction counter to the movement direction which was originally to be braked.

In this motion, the brake element can optionally be assisted by the spring acting as a pretensioning element, provided that this was driven during the previous engagement of the brake element into its fully engaged position from a temporarily relaxed state to an oppositely pretensioned state. The resulting pretension can assist in pushing the brake element out of the fully engaged position when the brake device is released.

Without the support of the pressing element, however, the brake element would only be released from the fully engaged position until it was no longer pressed against the guide rail by the holder. In addition, the brake element could not be moved back to its original position, in particular because the pretensioning element would already be pushing in the opposite direction.

Using the pressing element, however, the brake element can also be pressed against the guide rail without a pressing interaction with the holder and can thus be held stationary on the guide rail. If the elevator car together with the holder is therefore moved further in the release direction, the brake element moves successively toward its original position, i.e., close to its free-running position, wherein the brake element fixed to the guide rail successively pretensions the spring forming the pretensioning element. Ultimately, the pretensioning element is brought into its deactivated configuration. The pawl forming the release element can then be moved from its previously released state back into its holding state and, for example, the electromagnet provided thereon can be activated in order to latch the pawl in the holding state. Overall, the brake device is then back in its initial configuration and is thus ready to be actuated for a subsequent braking process.

The entire process for releasing the brake device can be carried out automatically. It is not necessary, as is usually the case with conventional brake devices, for a technician to reset the brake device to its original configuration on site. Instead, the reset can be brought about solely by suitably shifting the elevator car in the release direction and temporarily actuating the pressing element of the brake device.

It is noted that some of the possible features and advantages of the invention are described herein with reference to different embodiments of the brake device or the elevator system equipped therewith or the method to be carried out therewith for releasing the previously activated brake device. A person skilled in the art will recognize that the features can be suitably combined, adapted or replaced in order to arrive at further embodiments of the invention.

Furthermore, it is noted that the applicant of the present patent application filed another patent application with the title "Brake device, e.g. with an eccentric element, for braking a traveling body that can be moved in a guided manner along a guide rail in a movement direction" having International Publication Number WO 2021/115845 A1. This further patent application describes embodiments which can also be implemented for the present patent application. In particular, embodiments are described therein in which the brake element is not designed to be wedge-shaped but as an eccentric element. The further patent application is incorporated herein in its entirety by reference.

Embodiments of the invention will be described below with reference to the accompanying drawings, with neither the drawings nor the description being intended to be interpreted as limiting the invention.

The drawings are merely schematic and not true to scale. The same reference signs refer to the same or similarly functioning features in the various figures.

DETAILED DESCRIPTION

Figure 1:
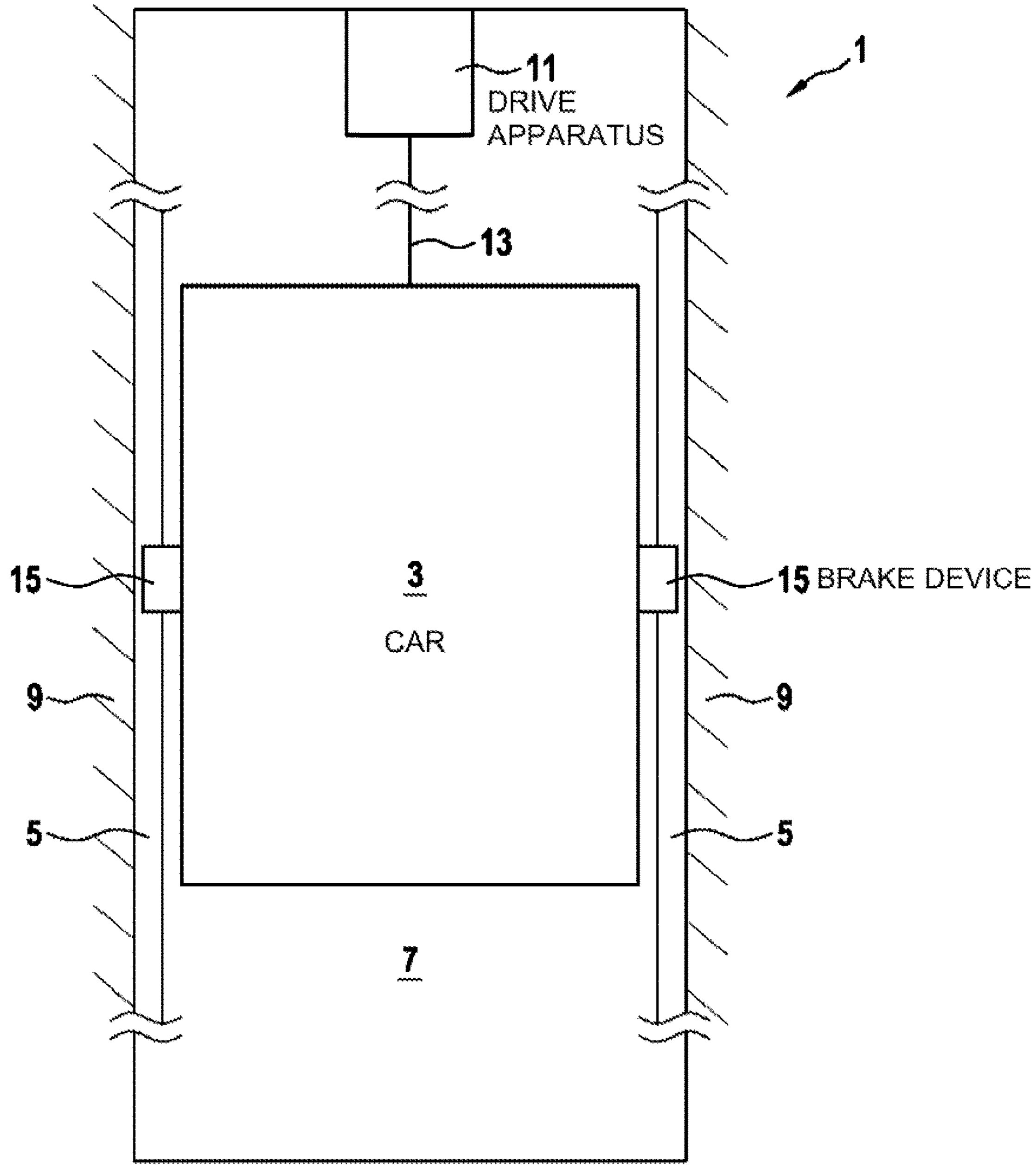
FIG. 1 shows an elevator system according to an embodiment of the present invention.

FIG. 1 shows an elevator system 1 according to an embodiment of the present invention. Only components which enable an understanding of the present invention are shown in the figure. The elevator system 1 can have further components which are not shown for reasons of clarity.

The elevator system 1 comprises a traveling body in the form of an elevator car 3 which can be moved vertically within an elevator shaft 7. During its vertical displacement, the elevator car 3 is guided laterally by guide rails 5 which are attached to lateral walls 9 of the elevator shaft 7 and extend along an entire travel path of the elevator car 3. The elevator car 3 is held by cable-like suspension means 13 which can be moved by means of a drive apparatus 11. Two brake devices 15 are attached to the elevator car 3. The brake devices 15 are each arranged so as to adjoin one of the guide rails 5 and can interact with this guide rail in order to generate a braking force.

Figure 2A:
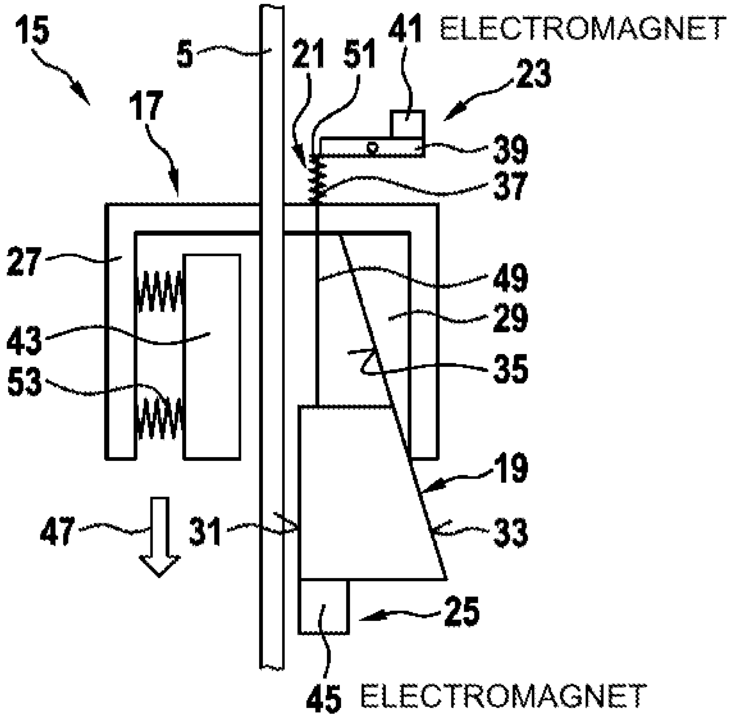
FIGS. 2*a-f* show a brake device according to an embodiment of the present invention in different stages when activating and then releasing the brake device.

FIG. 2*a* shows a brake device 15 according to an embodiment of the invention in cross section. The brake device 15 comprises a holder 17, a brake element 19, a pretensioning element 21, a release element 23 and a pressing element 25.

The holder 17 is implemented using a frame 27 in the example shown. This frame 27 can be attached to the elevator car 3. Furthermore, the holder 17 comprises a guide element 29 having a guide surface which extends obliquely to the guide rail 5 and acts as a counter bearing 35 for the brake element 19.

In the present case, the brake element 19 is designed as a braking wedge. The brake element 19 has a brake surface 31 directed toward the guide rail 5. The brake element 19 is held and mounted on the holder 17 in such a way that the brake element can be moved in or counter to a movement direction 47 in which the brake device 15 is moved relative to the guide rail 5, i.e., vertically, and can also be moved in a direction transverse to the movement direction 47, i.e., horizontally.

For such displaceability, a sliding surface 33 of the brake element 19 opposite the brake surface 31 can slide along on the inclined guide surface serving as a counter bearing 35 on the guide element 29 of the holder 17. The brake element 19 can be moved back and forth between a free-running position illustrated in FIG. 2*a* and a braking position illustrated in FIG. 2*b*. A suitable bearing (not shown), for example a sliding bearing or a bearing configured to have a plurality of rollers, can be formed on the sliding surface 33 of the brake element 19 and/or the counter bearing 35 of the guide element 29. In the free-running position, the brake surface 31 of the brake element 19 is spaced apart from an opposite surface of the guide rail 5, whereas in the braking position, the brake surface 31 of the brake element rests against the guide rail 5.

In order to be able to move the brake element 19 from its free-running position in the direction of its braking position, the brake device 15 has the pretensioning element 21. The pretensioning element 21 is an elastically deformable element such as a spring 37. In the example shown, this spring 37 is arranged between the frame 27 of the holder 17 and an end stop 51 of a rod 49 connected to the brake element 19. As long as the brake device 15 is not actuated, the pretensioning element 21 remains in a deactivated configuration, as illustrated in FIG. 2*a*. In this deactivated configuration, the pretensioning element 21 is mechanically pretensioned. In the example shown, the spring 37 used for this purpose is mechanically compressed.

In order to keep the pretensioning element 21 in this deactivated configuration as long as the brake device 15 is not actuated, the brake device 15 has the release element 23. In the example shown, this release element 23 is designed to have a pawl 39. This pawl 39 can be held in a holding state by means of an electromagnet 41 by means of the release element 23 holding the pretensioning element 21 in its first configuration. The pretensioning element 21 is an elastically deformable element such as a spring 37.

If the brake device 15 is intended to be actuated, the release element 23 can be activated into a released state, for example by means of the electromagnet 41 no longer being energized in the embodiment shown and the pawl 39 thus being released. The pawl 39 can then be moved from its latched position shown in FIG. 2*a*, in which the pawl blocks a motion of the spring 37 used as the pretensioning element 21, into an unlatched position shown in FIG. 2*b*, in which the pawl releases the pretensioning element 21. In the example shown, the pawl 39 can be pivoted about a central axis for this purpose.

Figure 2B:
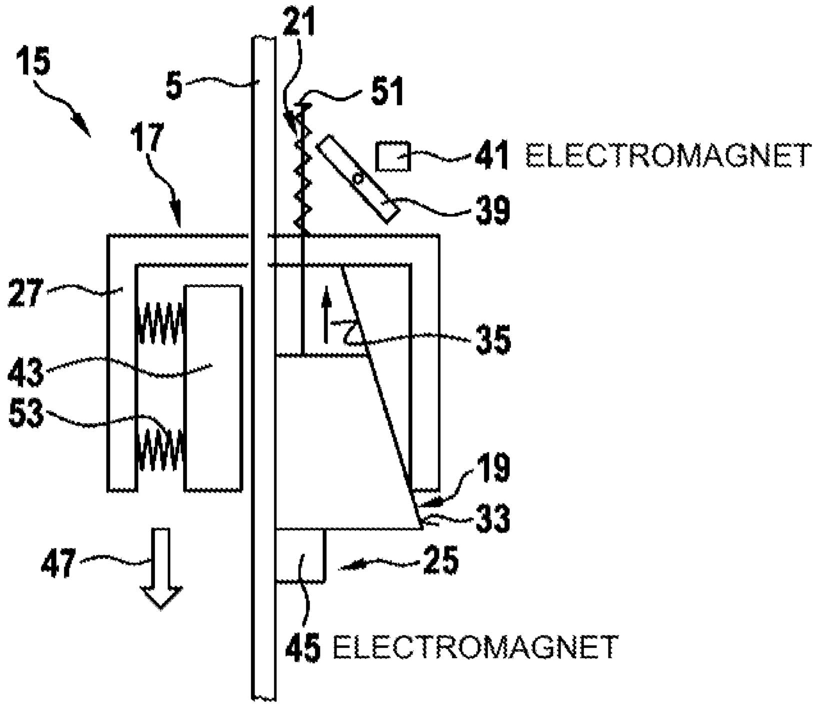

The pretensioning element 21 released in this way can then move the rod 49 with its end stop 51 and the brake element 19 fastened therein vertically upward, i.e., counter to the movement direction 47, due to the mechanical pretensioning prevailing therein, as illustrated in FIG. 2*b*. The sliding surface 33 of the brake element 19 slides along the counter bearing 35 and is correspondingly pushed against the guide rail 5 with its brake surface 31.

In order to be able to suitably counteract the force exerted on the brake element 19 and, via this, on the holder 17, the brake device 15 has a counter pressure element 43 which is also attached to the holder 17 and is supported by counter pressure springs 53 in relation to the frame 27 of the holder 17.

As soon as the brake surface 31 of the brake element 19 rests against the guide rail 5, the brake element 19 is further moved in the movement direction 47 counter to this movement direction 47 along the obliquely extending counter bearing 35 due to the relative movement between the brake device 15 and the guide rail 5. Due to the wedge-shaped configuration of the brake element 19, the pressing pressure exerted by the brake element 19 on the guide rail 5 via its brake surface 31 increases. The overall braking effect achieved by the brake device 15 is therefore self-reinforcing.

Figure 2C:
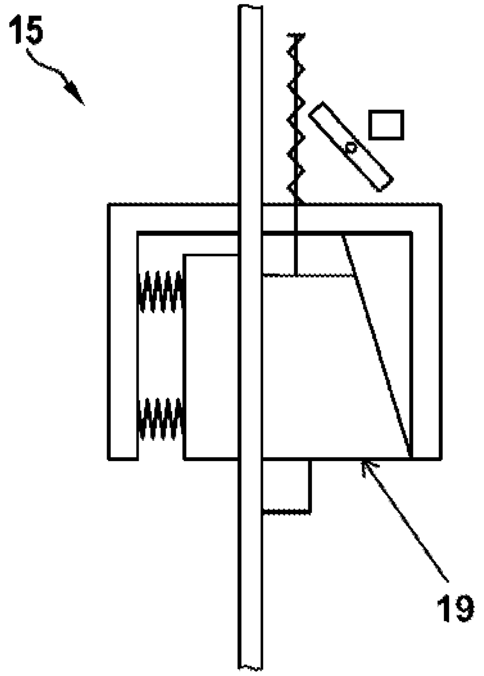

Ultimately, the brake element 19 is moved into a fully engaged configuration as shown in FIG. 2*c*. In this configuration, the brake device 15 causes high braking forces, by means of which the elevator car 3 attached to the element can be braked to a standstill effectively and quickly.

During the motion of the brake element 19 from the position in which it reaches its braking position and first rests against the guide rail 5 with its brake surface 31 to the position in which the brake element 19 has reached its fully engaged configuration, the brake element 19 is further moved relative to the frame 27 of the holder 17. As a result of this, the pretensioning element 21, which is fastened at one end to the end stop 51 of the rod 49, is also stretched beyond its temporarily relaxed configuration into a configuration pretensioned under tension.

In the case of conventional brake devices, it is difficult to release a brake device, i.e., return it to its initial configuration, once it has been actuated and the brake element has been moved into its fully engaged configuration.

Figure 2D:
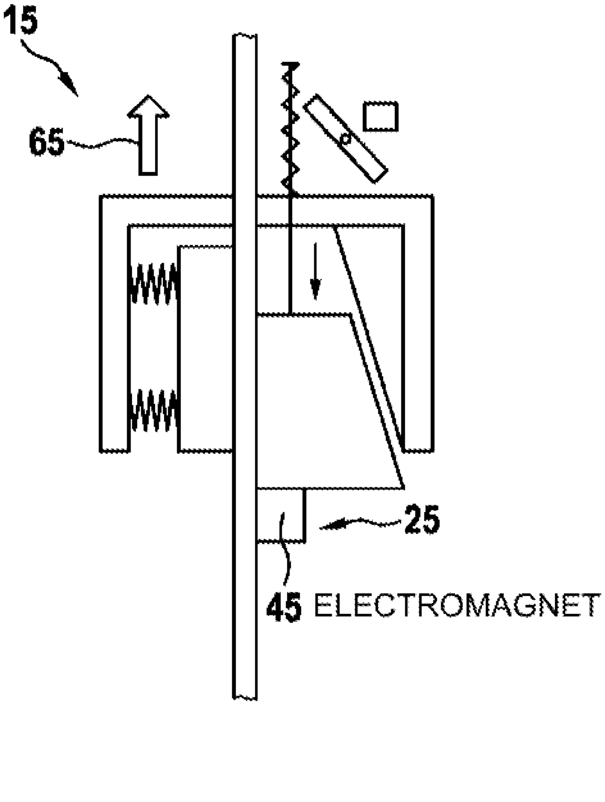
Figure 2E:
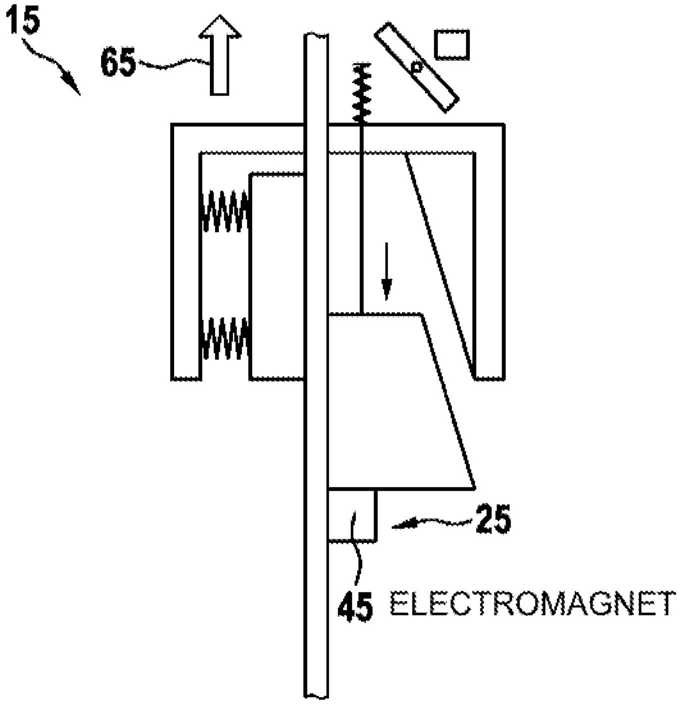
Figure 2F:
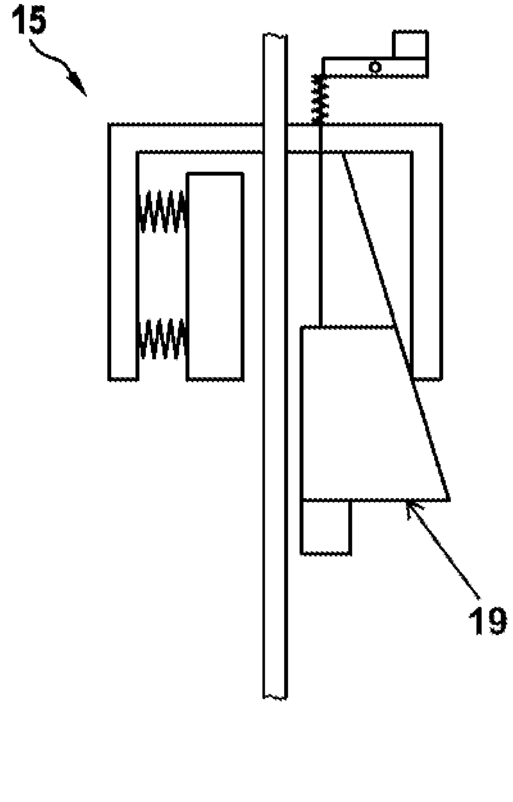

With reference to FIGS. 2*d* to 2*f*, it is described below how, using the brake device 15 presented here, such a release of the brake device 15 can be carried out easily and generally without the need for intervention by a technician, i.e., fully automated at best.

To release the brake device 15, its pressing element 25 is first actuated. In the example shown, the electromagnet 45 of the pressing element 25 is energized for this purpose. Here, the electromagnet 45 produces a magnetic field, as a result of which the pressing element 25 is pulled toward the magnetizable guide rail 5. Since the pressing element 25 is rigidly connected to the brake element 19, this force pulls the brake element 19 toward the guide rail 5. Furthermore, since the pressing element 25 is attached so as to adjoin the brake surface 31 of the brake element 19, i.e., it is arranged flush with this brake surface 31 in the example shown, the brake surface 31 of the brake element 19 is pressed against the guide rail 5 using the actuated pressing element 25 and in this way the brake element 19 is fixed in a stationary manner on the guide rail 5.

After the pressing element 25 has been actuated in this way, as illustrated in FIG. 2*d*, the elevator car 3 is moved, using the drive apparatus 11, counter to the original movement direction 47 in a release direction 65, i.e., upward in the example shown. As a result, the holder 17 is also moved together with the elevator car 3. Since the brake element 19 is pressed against the guide rail 5 and is held in a stationary manner on it, the brake element 19 is thereby moved out of its previously fully engaged configuration.

Without the pressing effect of the pressing element 25, however, the brake element 19 would soon lose the pressing pressure against the guide rail 5 since it would no longer be held pressed against the guide rail 5 by the counter bearing 35 of the guide element 29. The pretensioning element 21 would then transfer the motion of the holder 17 to the brake element 19. Accordingly, the brake element 19 would then begin to move together with the holder 17. Thus, the brake element 19 could not be restored all the way back to its original configuration.

However, the pressing effect of the pressing element 25 causes the brake element 19 to remain stationary on the guide rail 5 even without interaction with the counter bearing 35. Accordingly, the brake element 19 can be further moved relative to the mount 17, as illustrated in FIG. 2*e*, in that the elevator car 3 together with the holder 17 is moved further in the movement direction 47.

The pretensioning element 21 is thereby successively compressed until it has finally reached its deactivated configuration again. In this set-up, as shown in FIG. 2*f*, the release element 23 can be reconfigured back into its holding state. For this purpose, the electromagnet 41 can be energized and the pawl 39 can thereby be moved back into its latched position.

Ultimately, the pressing effect that can be generated using the pressing element 25 can hold the brake element 19 on the guide rail 5 until it has reached its initial position relative to the holder 17, and the entire brake device 15 can in this way be automatically returned to its original configuration.

Figure 3:
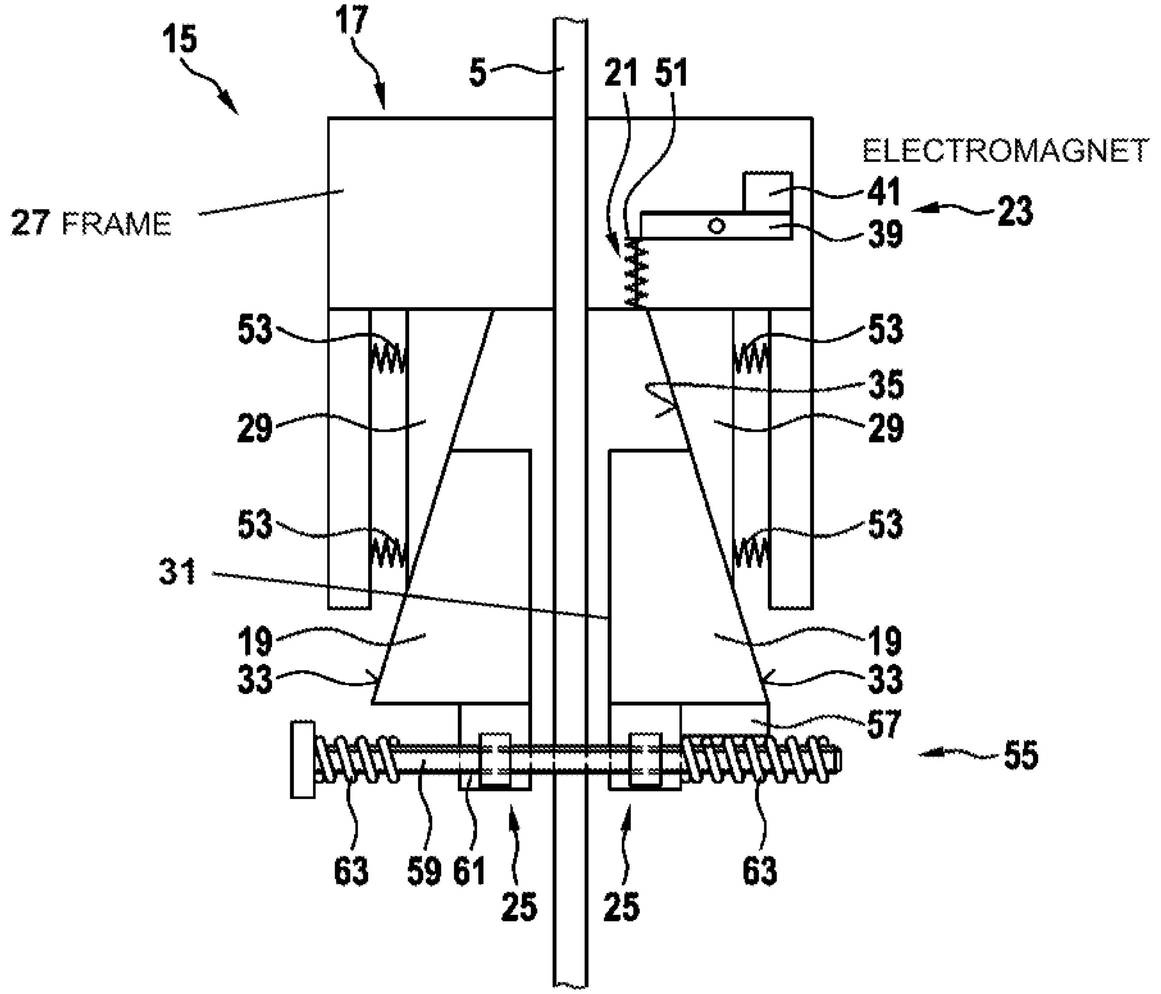
FIG. 3 shows an embodiment of a brake device according to an alternative embodiment of the present invention.

Finally, an alternative embodiment of the brake device 15 is described with reference to FIG. 3. In this embodiment, the brake device 15 has two brake elements 19 which are arranged on opposite sides relative to the guide rail 5. Accordingly, the holder 17 has two oppositely inclined surfaces, which act as counter bearings 35, on corresponding guide elements 29. Each of the brake elements 19 can slide along one of these counter bearings 35 with its sliding surface 33. A pressing pressure ultimately caused by the brake elements 19 on the guide rail 5 in a fully engaged configuration can be adjusted or limited by counter pressure springs 53 which in this case support each of the guide elements 29 on the frame 27 of the holder 17.

In the example shown, the pressing element 25 is formed using a mechanism 55 which is configured to move the two brake elements 19 toward one another and thereby press their brake surfaces 31 against the guide rail 5 arranged between them. For this purpose, the mechanism 55 can drive a threaded rod 59 by means of an electric motor 57, and the threaded rod 59 can interact with a counter element 61 arranged on an opposite side of the guide rail 5. Pretensioning springs 63 can bring about mechanical pretensioning within the mechanism 55.

Finally, it should be noted that terms such as "comprising," "having," etc., do not preclude other elements or steps and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A brake device for braking a traveling body of an elevator system, the traveling body being movable in a guided manner along a guide rail in a movement direction, the brake device comprising:

a holder adapted to be attached to the traveling body;

a brake element;

a pretensioning element;

a release element;

a pressing element;

wherein the brake element is held and mounted on the holder and has a brake surface directed toward the guide rail when the holder is attached to the traveling body, the brake element being movable relative to the holder between a free-running position and a braking position, wherein the brake surface is spaced laterally apart from the guide rail in the free-running position and is pressed laterally against the guide rail in the braking position;

wherein the pretensioning element, in a deactivated configuration, does not exert a force on the brake element to move the brake element toward the braking position and, in an activated configuration, exerts a force on the brake element that moves the brake element toward the braking position;

wherein the release element holds the pretensioning element in a holding state and, when the release element is activated into a released state, reconfigures the pretensioning element from the deactivated configuration into the activated configuration; and wherein the pressing element, in an unactuated state, does not generate a force on the brake element in a direction oriented toward the guide rail and, in an actuated state, generates a force on the brake element in a direction oriented toward the guide rail.

2. The brake device according to claim 1 wherein the brake element has a width, measured between the brake surface and a sliding surface opposite the brake surface, that tapers in the movement direction, and wherein the holder forms a counter bearing along which the sliding surface of the brake element is movable in cooperation with the counter bearing between the free-running position and the braking position.

3. The brake device according to claim 1 wherein the brake element is wedge-shaped.

4. The brake device according to claim 1 wherein the pretensioning element is elastically deformable and interacts with the holder on one side and with the brake element on another side such that, in the activated configuration, the pretensioning element moves the brake element until the brake surface is in mechanical contact with the guide rail.

5. The brake device according to claim 4 wherein the pretensioning element is a spring element.

6. The brake device according to claim 1 wherein the pretensioning element is elastically deformable element and interacts with the holder on one side and with the brake element on another side such that, in the deactivated configuration, the pretensioning element is pretensioned in a first direction and such that, in a fully engaged configuration of the brake element, the pretensioning element is pretensioned in a second direction opposite to the first direction, wherein, in the fully engaged configuration, the brake element is movable by friction on the guide rail counter to the movement direction beyond a position in which the brake element, coming from the free-running position, first rests against the guide rail.

7. The brake device according to claim 1 wherein the release element is a pawl movable between a latched position and an unlatched position, and wherein the pawl, in the latched position, holds the pretensioning element in the deactivated configuration, and the pawl, in the unlatched position, releases the pretensioning element into the activated configuration.

8. The brake device according to claim 1 wherein the pressing element includes an electromagnet.

9. The brake device according to claim 1 wherein the pressing element is rigidly connected to the brake element.

10. The brake device according to claim 1 wherein the pressing element is attached to the brake element and adjoins the brake surface of the brake element.

11. The brake device according to claim 1 wherein the brake device has two of the brake element, the brake elements being arranged on opposite sides of the guide rail when the holder is attached to the traveling body, and at least one of the pressing element that cooperates with the brake elements.

12. The brake device according to claim 1 wherein the pressing element has a mechanism adapted to shift the pressing element toward a counter element arranged on an opposite side of the guide rail relative to the pressing element.

13. An elevator system comprising:

a guide rail;

a traveling body movable in a guided manner along the guide rail in a movement direction;

a drive apparatus for moving the traveling body in the movement direction; and the brake device according to claim 1 attached to the traveling body by the holder and arranged adjoining the guide rail.

14. A method for releasing a previously activated brake device in the elevator system according to claim 13, wherein when the brake device is activated, the brake element is engaged by moving the brake element relative to the holder opposite the movement direction of the traveling body to be braked into a fully engaged position in which the brake surface rests against the guide rail and the brake element is clamped between the guide rail and the holder, the method comprising the steps of:

actuating the pressing element of the brake device; and moving the brake device by moving the traveling body using the drive apparatus in a release direction opposite to the movement direction.

15. The method according to claim 14 wherein the traveling body is moved in the release direction until the brake element being held stationary on the guide rail by the actuated pressing element is moved relative to the holder into a fixing position in which the pretensioning element is in a position corresponding to the deactivated configuration, and wherein the release element transitions from the released state into the holding state to hold the pretensioning element in the deactivated configuration.

16. A brake device for braking a traveling body of an elevator system, the traveling body being movable in a guided manner along a guide rail in a movement direction, the brake device comprising:

a holder adapted to be attached to the traveling body;

a brake element;

a pretensioning element;

a release element;

a pressing element;

wherein the brake element is held and mounted on the holder and has a brake surface directed toward the guide rail when the holder is attached to the traveling body, the brake element being movable relative to the holder between a free-running position and a braking position, wherein the brake surface is spaced laterally apart from the guide rail in the free-running position and is pressed laterally against the guide rail in the braking position;

wherein the pretensioning element, in a deactivated configuration, does not exert a force on the brake element to move the brake element toward the braking position and, in an activated configuration, exerts a force on the brake element that moves the brake element toward the braking position;

wherein the release element holds the pretensioning element in a holding state and, when the release element is activated into a released state, reconfigures the pretensioning element from the deactivated configuration into the activated configuration;

wherein the pressing element, in an unactuated state, does not generate a force on the brake element in a direction oriented toward the guide rail and, in an actuated state, generates a force on the brake element in a direction oriented toward the guide rail; and wherein the release element is a pawl movable between a latched position and an unlatched position, and wherein the pawl, in the latched position, holds the pretensioning element in the deactivated configuration, and the pawl, in the unlatched position, releases the pretensioning element into the activated configuration.

* * * * *